(12) United States Patent
Gonze et al.

(10) Patent No.: US 7,829,048 B1
(45) Date of Patent: Nov. 9, 2010

(54) ELECTRICALLY HEATED CATALYST CONTROL SYSTEM AND METHOD

(75) Inventors: Eugene V. Gonze, Pinckney, MI (US); Halim G. Santoso, Novi, MI (US); Brian Spohn, Holly, MI (US); Bryan Nathaniel Roos, Novi, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/537,373

(22) Filed: Aug. 7, 2009

(51) Int. Cl.
*B01D 53/94* (2006.01)
*F01N 3/10* (2006.01)
*F01N 3/24* (2006.01)

(52) U.S. Cl. ............................... 423/213.2; 423/DIG. 5; 423/DIG. 6; 60/300

(58) Field of Classification Search .............. 423/213.2, 423/DIG. 5, DIG. 6; 60/300
See application file for complete search history.

(56) References Cited

U.S. PATENT DOCUMENTS

| 5,655,364 | A | * | 8/1997 | Ma | 60/284 |
| 5,819,531 | A | * | 10/1998 | Kato et al. | 60/277 |
| 5,822,978 | A | * | 10/1998 | Streit et al. | 60/274 |
| 6,613,293 | B2 | * | 9/2003 | Dornseiffer et al. | 422/174 |
| 2002/0092298 | A1 | * | 7/2002 | Bruck et al. | 60/300 |
| 2010/0146938 | A1 | * | 6/2010 | Baum et al. | 60/285 |

OTHER PUBLICATIONS

U.S. Appl. No. 12/537,384, filed Aug. 7, 2009, Eugene V. Gonze.

* cited by examiner

*Primary Examiner*—Timothy C Vanoy

(57) ABSTRACT

An exhaust treatment system comprises M electrically heated substrates and a heater control module. The M electrically heated substrates are coated with a catalyst material and arranged in series to receive exhaust gas of an engine. M is an integer greater than one. The heater control module applies power to N of the M substrates to heat the N substrates during a predetermined period. N is an integer less than M. The engine is turned off and the M electrically heated substrates do not receive exhaust gas during the predetermined period.

20 Claims, 4 Drawing Sheets

ELECTRICALLY HEATED CATALYST CONTROL SYSTEM AND METHOD

CROSS-REFERENCE TO RELATED APPLICATIONS

This application is related to U.S. patent application Ser. No. 12/537,384, filed on Aug. 7, 2009. The disclosure of the above application is incorporated herein by reference in its entirety.

FIELD

The present disclosure relates generally to internal combustion engines and more particularly to exhaust treatment systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to produce drive torque. A byproduct of combustion is exhaust gas. The exhaust gas may include various components such as nitrogen oxides (NOx), carbon monoxide (CO), and hydrocarbons (HC). An exhaust treatment system includes a catalyst that converts the NOx, CO, and HC to carbon dioxide and water.

Conversion efficiency of the catalyst refers to the ability of the catalyst to react with or convert one or more components of the exhaust gas. The conversion efficiency of the catalyst is related to the temperature of the catalyst. The catalyst may operate at a reduced conversion efficiency when the catalyst temperature is less than a threshold temperature. The catalyst efficiency may be increased by increasing the catalyst temperature to be greater than or equal to the threshold temperature.

The catalyst temperature may be increased using various methods. For example only, heat from the exhaust gas exiting the engine may increase the catalyst temperature. The exhaust gas transfers heat to the catalyst via convection, thereby increasing the catalyst temperature. Fueling to the engine may also be adjusted to increase the catalyst temperature. For example only, unburned fuel from the engine may enter the catalyst where the fuel combusts with oxygen in the catalyst to increase the catalyst temperature. Air may be pumped into the exhaust gas and/or catalyst to increase the amount of oxygen in the catalyst.

Hybrid vehicles may include an internal combustion engine and an electric motor. The electric motor may be used more often when vehicle kinetic energy can be recovered by regenerative braking, converted to electric and chemical form, and stored in a battery, from which the motor is driven (e.g. in city driving). The internal combustion engine may be used when wheel braking and opportunities for energy recovery are infrequent, and the engine operates at its greatest efficiency (e.g. in highway driving). In mixed city and highway driving conditions, the electric motor and internal combustion engine may be used together to transmit power to a transmission input shaft, depending on driving conditions and the magnitude of the battery capacity.

Hybrid vehicles may experience long periods of engine off-time during idle and driving scenarios. During the periods of engine off-time, the catalyst temperature may decrease below the threshold temperature. Accordingly, catalyst heating may be required to obtain peak efficiency of the catalyst. Maintaining the catalyst temperature at approximately the threshold temperature during engine-off periods increases the conversion efficiency of the catalyst when the engine is started.

SUMMARY

An exhaust treatment system comprises M electrically heated substrates and a heater control module. The M electrically heated substrates are coated with a catalyst material and arranged in series to receive exhaust gas of an engine. M is an integer greater than one. The heater control module applies power to N of the M substrates to heat the N substrates during a predetermined period. N is an integer less than M. The engine is turned off and the M electrically heated substrates do not receive exhaust gas during the predetermined period. In other features, the engine is disabled during the predetermined period.

In other features, the heater control module stops applying power to the N substrates and starts applying power to P other ones of the M substrates to heat the P substrates after the N substrates reach a predetermined temperature. P is an integer less than M.

In still other features, N is one and the heater control module applies power to a first one of the M substrates. The heater control module stops applying power to the first one and starts applying power to a second one of the M substrates when a temperature of the first one reaches a threshold temperature.

In still other features, N is one and the heater control module applies power to each of the M substrates one at a time. The heater control module stops applying power to each substrate when a temperature of the substrate reaches a threshold temperature during the predetermined period.

In still other features, the heater control module applies power to the N substrates for a predetermined period. In yet other features, the M electrically heated substrates include an electrically resistive substrate that generates heat when the heater control module applies power. In still other features, the catalyst material includes a three-way catalyst material.

In still other features, the exhaust treatment system includes P non-electrically heated substrates coated with the catalyst material and arranged in series with the M electrically heated substrates that receive the exhaust gas of the engine, wherein P is an integer greater than or equal to one. In still other features, M is three or more and N is one.

A method comprises the steps of: providing M electrically heated substrates that are coated with a catalyst material and that are arranged in series to receive exhaust gas of an engine, wherein M is an integer greater than one; and applying power to N of the M substrates to heat the N substrates during a predetermined period, wherein N is an integer less than M. The engine is turned off and the M electrically heated substrates do not receive exhaust gas during the predetermined period. In other features, the method further comprises disabling the engine during the predetermined period.

In still other features, the method further comprises stopping application of power to the N substrates; and starting application of power to P other ones of the M substrates to heat the P substrates after the N substrates reach a predetermined temperature, wherein P is an integer less than M.

In still other features, the method further comprises applying power to a first one of the M substrates, wherein N is one; stopping application of power to the first one; and starting application of power to a second one of the M substrates when a temperature of the first one reaches a threshold temperature.

In still other features, the method further comprises applying power to each of the M substrates one at a time, wherein N is one; and stopping application of power to each substrate when a temperature of the substrate reaches a threshold temperature during the predetermined period. In still other feature, the method further comprises applying power to the N substrates for a predetermined period.

In still other features, the method further includes providing M electrically heated substrates that include an electrically resistive substrate that generates heat when power is applied. In still other features, the catalyst material includes a three-way catalyst material.

In still other features, the method further comprises providing P non-electrically heated substrates coated with the catalyst material and arranged in series with the M electrically heated substrates that receive the exhaust gas of the engine, wherein P is an integer greater than or equal to one. In still other features, M is three or more and N is one.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
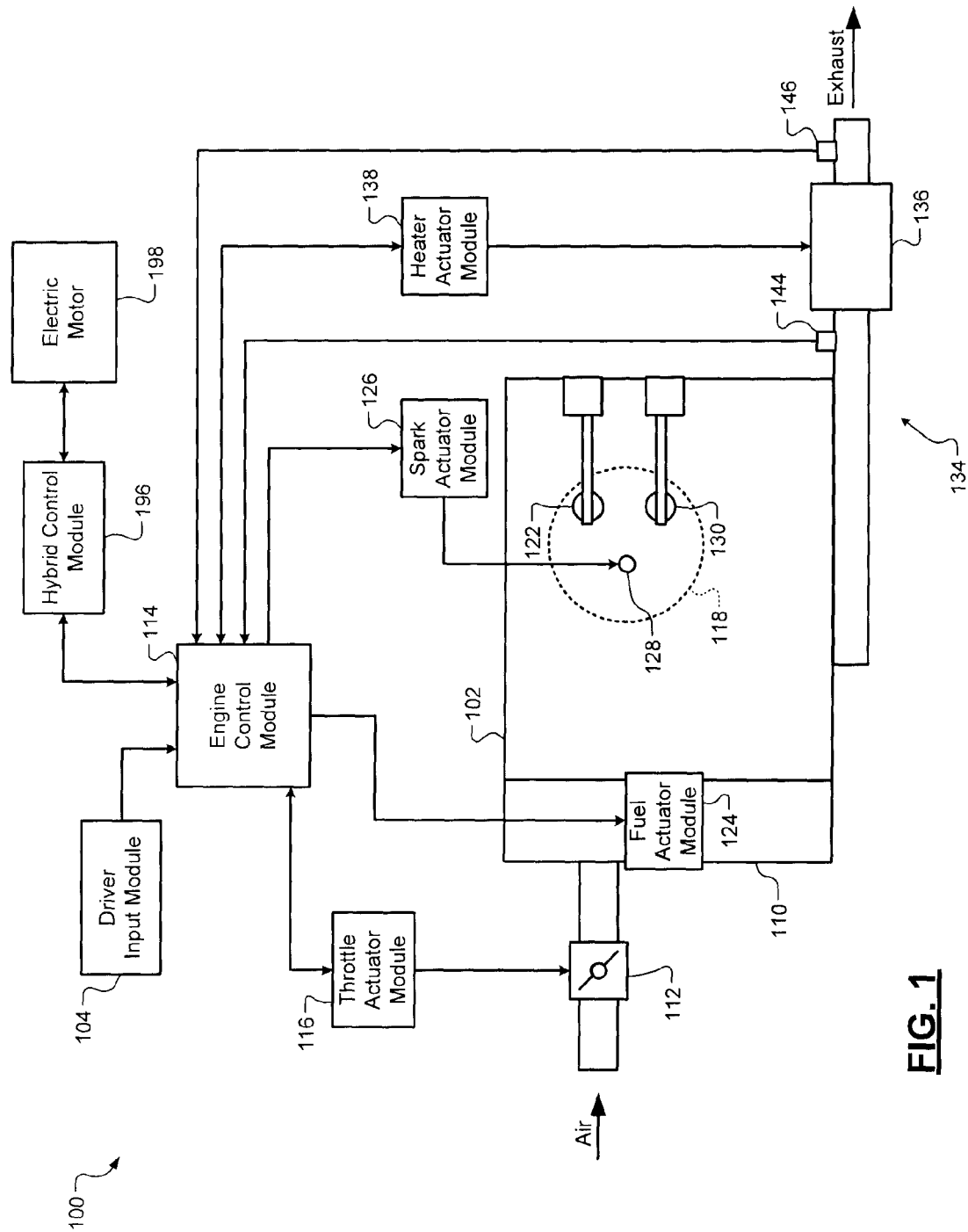
FIG. 1 is a functional block diagram of an exemplary hybrid vehicle system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A hybrid vehicle includes an engine and one or more electric motors that control drive torque output to wheels of the vehicle. In some circumstances, the engine is disabled and torque output to the wheels is controlled by the one or more electric motors. The engine may be disabled to, for example, increase the fuel efficiency of the vehicle.

An exhaust system that receives exhaust gas output by the engine includes a plurality of electrically heated catalysts (EHCs). The EHCs include a catalyst material that reacts with various components of the exhaust gas to reduce the amount of targeted components of the exhaust gas. The catalyst material of the EHCs, however, reacts with the targeted components of the exhaust gas at temperatures at or above a predetermined (i.e., threshold) temperature, such as 300° C. When the engine is disabled, the temperature of the EHCs may fall below the threshold temperature.

Accordingly, power is sequentially applied to electrically resistive substrates of the EHCs to heat the catalyst of the EHCs to or above the threshold temperature while the engine is disabled. Power is applied to heat the EHCs one EHC at a time. Heating a plurality of smaller EHCs, one at a time, rather than a single larger EHC, decreases the period necessary to increase the temperature of the catalyst to the predetermined temperature. Similarly, sequentially heating one EHC at a time, rather than all of the EHCs, decreases the period necessary to increase the temperature. The implementation of more than one smaller EHC rather than the single larger EHC also provides more uniform heating and enables a lesser amount of power to be drawn to heat the EHCs to the predetermined temperature.

Referring now to FIG. 1, a functional block diagram of an exemplary hybrid vehicle system 100 is presented. The hybrid vehicle system 100 includes an engine 102 that combusts an air/fuel mixture to produce drive torque based on a driver input module 104. Air is drawn into an intake manifold 110 through a throttle valve 112. For example only, the throttle valve 112 may include a butterfly valve having a rotatable blade. An engine control module (ECM) 114 may control a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders.

The injected fuel mixes with air and creates an air/fuel mixture in the cylinder 118. A piston (not shown) within the cylinder 118 compresses the air/fuel mixture. Based upon a signal from the ECM 114, a spark actuator module 126 may energize a spark plug 128 in the cylinder 118, which ignites the air/fuel mixture. The timing of the spark may be specified relative to the time when the piston is at its topmost position, referred to as top dead center (TDC). In diesel and compression ignition engines, compression by the piston may ignite the air/fuel mixture.

The spark actuator module 126 may be controlled by a timing signal indicating how far before or after TDC the spark should be provided. Operation of the spark actuator module 126 may therefore be synchronized with crankshaft rotation.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the hybrid vehicle via an exhaust system 134.

The exhaust system 134 includes a catalyst assembly 136. The catalyst assembly 136 includes a plurality of electrically heated catalysts (EHCs). The catalyst assembly 136 may include one or more non-electrically heated catalysts. The catalyst assembly 136 is discussed in detail below. A heater actuator module 138 selectively applies power to one or more EHCs based on signals from the ECM 114.

Exhaust gas exits the engine 102 through the exhaust valve 130 and enters the exhaust system 134. A temperature sensor 144 may measure a temperature of the exhaust gas before the exhaust gas enters the catalyst assembly 136. A second temperature sensor 146 may measure a temperature of the exhaust gas after the exhaust gas exits the catalyst assembly 136. Other temperature sensors (not shown) may measure exhaust gas temperatures in between the temperature sensors 144 and 146 and at various locations in the exhaust system 134. For example only, multiple temperature sensors may measure catalyst temperatures at multiple locations. The exhaust gas temperatures may be modeled by the ECM 114 based on predetermined tables and/or measured temperatures. The ECM 114 may model the catalyst temperatures.

The ECM 114 may use signals from various sensors to make control decisions for the hybrid vehicle system 100. The ECM 114 also controls operation of the engine 102 and the torque output of the engine 102. The ECM 114 may communicate with a hybrid control module 196 to coordinate operation of the engine 102 and an electric motor 198. While only the electric motor 198 is shown, the hybrid vehicle system 100 may include more than one electric motor.

In some circumstances, the electric motor 198 may be used to produce drive torque that supplements torque output by the engine 102. In other circumstances, the engine 102 may be shut down (i.e., disabled) to increase fuel economy of the hybrid vehicle system 100. The electric motor 198 supplies drive torque when the engine 102 is shut down.

The electric motor 198 may also function as a generator. The electric motor 198 may be used to generate electrical energy for use by the various components of the hybrid vehicle system 100 and/or storage. In various implementations, various functions of the ECM 114 and the hybrid control module 196 may be integrated into one or more modules.

The ECM 114 selectively operates the hybrid vehicle in a combustion mode. The combustion mode includes using the engine 102 to produce drive torque. The ECM 114 also selectively operates the hybrid vehicle in an electric mode. The electric mode includes using the electric motor 198 to produce drive torque. The ECM 114 may operate the hybrid vehicle in a blended mode by using both the engine 102 and the electric motor 198 to produce drive torque. The ECM 114 may select the mode of operation based on a desired torque output which may be based on driver input.

Figure 2:
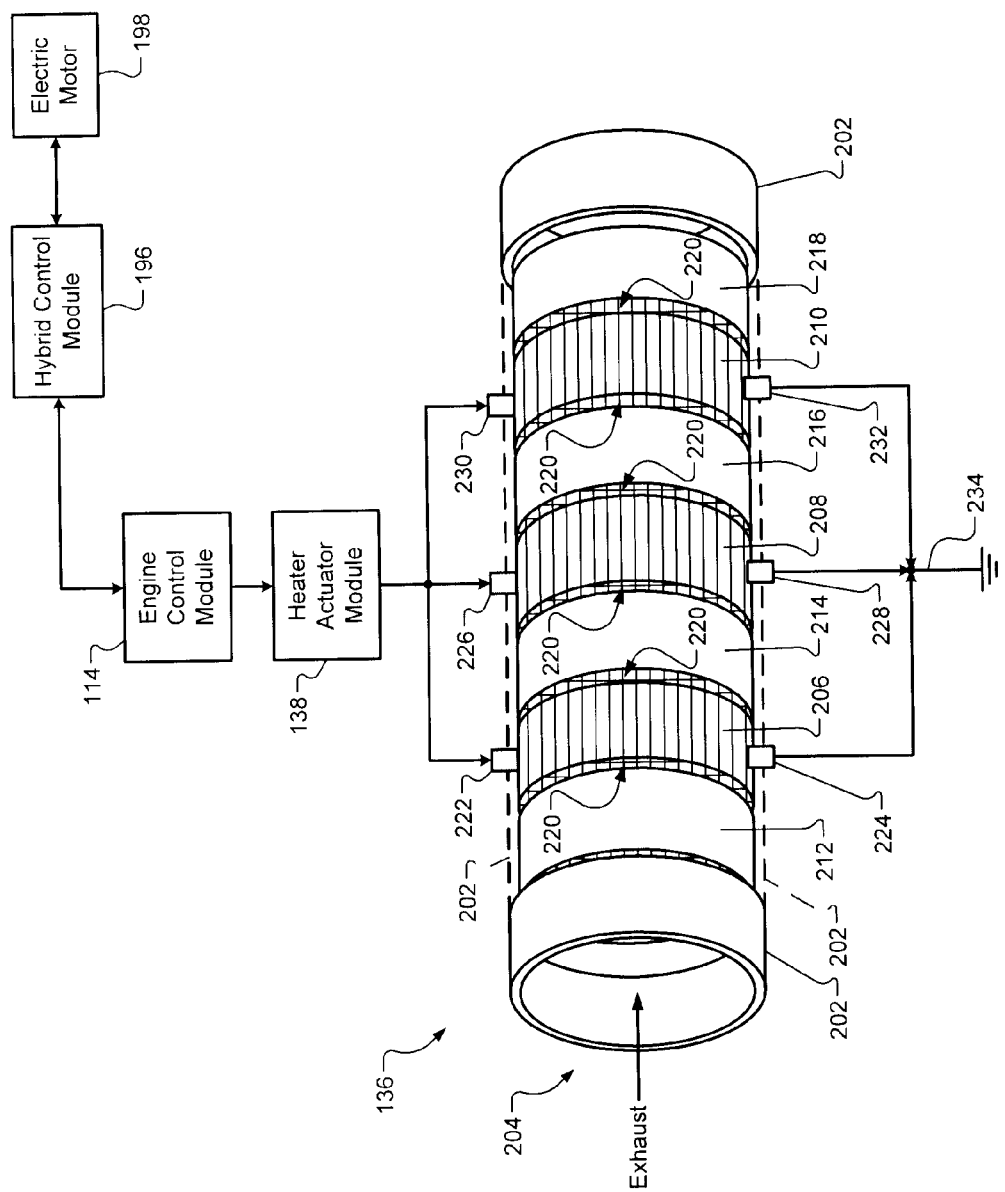
FIG. 2 is an exemplary segmented, cross-sectional perspective view of a catalyst assembly including a plurality of electrically heated catalysts (EHCs) according to the principles of the present disclosure.

Referring now to FIG. 2, an exemplary segmented, cross-sectional perspective view of the catalyst assembly 136 is shown. The catalyst assembly 136 may include a housing 202 that is coupled with the exhaust system 134 to receive exhaust gas output by the engine 102. The catalyst assembly 136 receives exhaust gas output by the engine 102 at an inlet 204.

A plurality of electrically heated catalysts (EHCs) are implemented within the housing 202 of the catalyst assembly 136. For example only, FIG. 2 depicts three EHCs 206, 208, and 210. While the three EHCs 206-210 are described and shown, the catalyst assembly 136 may include two or more EHCs. For example only, the number of EHCs implemented in a vehicle may be based on a battery load, load on the electric motor 198, an alternator/generator electrical output, and/or other electrical components associated with an electrical system of the vehicle.

Each of the EHCs 206-210 includes a substrate, such as cordierite, aluminum, and/or another suitable material. The substrates may be formed in a honeycomb arrangement or in another suitable arrangement. A catalyst is applied to each of the substrates of the EHCs 206-210. The catalyst may include, for example, platinum, rhodium, and/or another three-way catalyst. The catalyst reacts with various components of the exhaust gas to reduce the amount of those components in the exhaust gas.

A plurality of non-electrically heated catalysts may also be implemented within the housing 202 of the catalyst assembly 136. For example only, the catalyst assembly 136 may include four passive three-way catalysts (TWCs) 212, 214, 216, and 218. While the four TWCs 212-218 are described and shown, the catalyst assembly 136 may include any number of non-electrically heated catalysts. Alternatively, the catalyst assembly 136 may not include any non-electrically heated catalysts. Each of the TWCs 212-218 also includes a substrate, such as cordierite, aluminum, and/or another suitable substrate. These substrates may also be formed in a honeycomb arrangement or in another suitable arrangement.

A catalyst is also applied to each of the substrates of the TWCs 212-218. The catalyst may include, for example, platinum, rhodium, and/or another suitable three-way catalyst. In some implementations, the same three-way catalyst is applied to both the TWCs 212-218 and the EHCs 206-210. The catalyst of the TWCs 212-218 also reacts with various components of the exhaust gas to reduce the amount of those components in the exhaust gas.

Each of the EHCs 206-210 is separated from each of the TWCs 212-218. In other words, a buffer zone is provided between each of the EHCs 206-210 and the TWCs 212-218. When no TWCs are present, the buffer zones may be provided between each of the EHCs 206-210. Exemplary buffer zones between the EHCs 206-210 and the TWCs 212-218 are illustrated by buffer zones 220. The buffer zones 220 may be implemented to, for example, prevent electrical grounding of the EHCs 206-210.

The catalysts of the EHCs 206-210 and the TWCs 212-218 are effective in reacting with the exhaust gas when the temperature of the catalyst is greater than the threshold temperature (e.g., 300° C.). The heater actuator module 138 selectively applies power to the EHCs 206-210 based on signals from the ECM 114. The heater actuator module 138 applies power to the EHCs 206-210 via electrical connectors that are associated with each of the EHCs 206-210. For example only, electrical connectors 222 and 224 are associated with the EHC 206. Electrical connectors 226 and 228 are associated with the EHC 208, and electrical connectors 230 and 232 are associated with the EHC 210.

Power is applied to each of the EHCs 206, 208, and 210 via the associated electrical connectors 222, 226, and 230, respectively. The power may be supplied by, for example, an energy storage device (e.g., a battery), and/or another suitable power source. Power flows through substrates of the EHCs 206, 208, and 210 to the electrical connectors 224, 228, and 232, respectively. The electrical connectors 224, 228, and 232 are electrically connected to a ground source 234, such as a ground source that is common to the power source. The substrates provide electrical resistance and function as electrically resistive heaters that generate heat when power is applied.

The application of power to the substrates of the EHCs 206-210 causes each of the EHCs 206-210 to generate (resistive) heat. The ECM 114 selectively applies power to the EHCs 206-210 when the engine 102 is disabled (i.e., shut down) and the electric motor 198 is enabled (i.e., outputting torque). In other words, the ECM 114 selectively applies power to the EHCs 206-210 during operation in the electric mode.

The heater actuator module 138 sequentially applies the power to each of the EHCs 206-210, one at a time. For example only, the heater actuator module 138 may apply power to a first EHC, such as EHC 206. When the temperature of the first EHC is greater than or equal to the threshold temperature (e.g., 300° C.), the heater actuator module 138 may stop applying power to the first EHC and begin applying power to a second EHC, such as EHC 208. Each EHC 206-210 increases to the threshold temperature at a faster rate than when more than one of the EHCs 206-210 are heated at the same time. The heater actuator module 138 may apply a predetermined amount of power to each of the EHCs 206-210. The predetermined power amount may be set based on characteristics of the EHCs 206-210.

Resistively heating the EHCs 206-210 to or above the threshold temperature enables the catalyst of the heated EHCs 206-210 to react with exhaust gas when the engine 102 is started (i.e., turned on). Implementation of more than one smaller EHC rather than a single larger EHC decreases the period necessary to increase the temperature of a portion of the catalyst to the threshold temperature. The implementation of more than one smaller EHC rather than the single larger EHC also provides more uniform heating and enables a lesser amount of power to be drawn to heat the EHCs to the threshold temperature. Smaller EHCs may also be manufactured more easily than larger EHCs.

Figure 3:
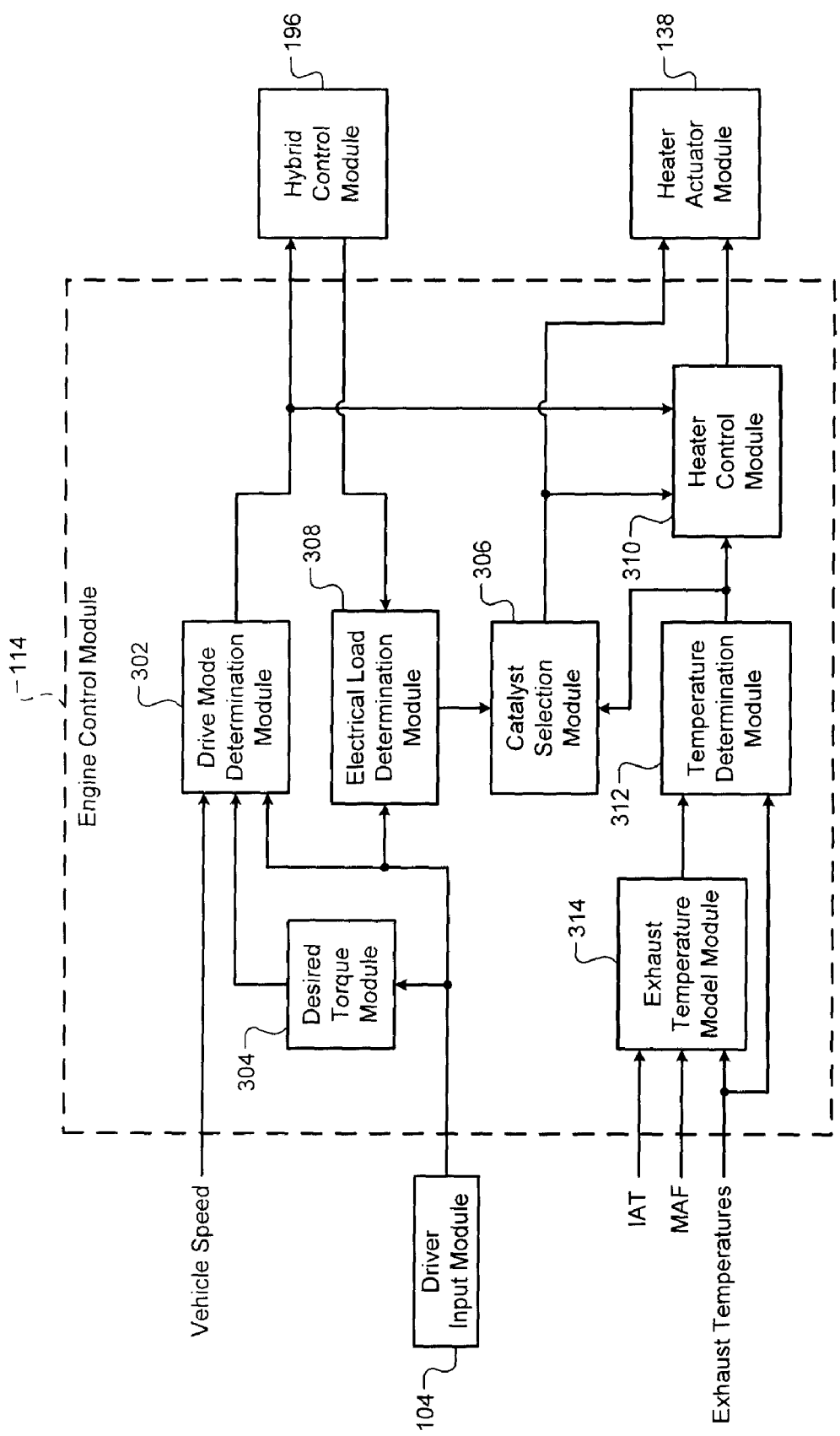
FIG. 3 is a functional block diagram of an exemplary engine control module according to the principles of the present disclosure.

Referring now to FIG. 3, an exemplary implementation of the ECM 114 is shown. The ECM 114 may include a drive mode determination module 302 that enables at least one of the engine 102 and the electric motor 198 based on at least one of vehicle speed, driver input, and a desired torque. A vehicle speed sensor (not shown), such as a wheel speed sensor, may measure the speed of the vehicle. A desired torque module 304 may determine the desired torque based on driver input and other engine system signals.

When the engine 102 is enabled, the ECM 114 may control actuator values to generate drive torque. For example only, the ECM 114 may control the throttle actuator module 116, the spark actuator module 126, and/or the fuel actuator module 124 when the engine 102 is enabled. When the electric motor 198 is enabled, the hybrid control module 196 may control the electric motor 198 to generate drive torque.

The ECM 114 may include a catalyst selection module 306 that determines which of the EHCs 206-210 to heat when the electric motor 198 is enabled and the engine 102 is disabled. The catalyst selection module 306 may determine to heat each EHC one at a time. Alternatively, the number of EHCs 206-210 heated at the same time may be based on an electrical load of the hybrid vehicle system 100.

An electrical load determination module 308 may determine the electrical load on the hybrid vehicle system 100 based on the electrical load of the electric motor 198 and other electrical loads. The hybrid control module 196 may determine the electrical load of the electric motor 198 based on the power output of the electric motor 198.

The ECM 114 may include a heater control module 310 that determines the amount of energy to be applied by the heater actuator module 138 to heat each EHC to the threshold temperature. The amount of energy may be based on the temperature of each EHC. A temperature determination module 312 may determine each EHC temperature based on a measured exhaust temperature. For example only, temperature sensors 144 and 146 may be used to determine the EHC temperature. The EHC temperature may be determined based on an exhaust temperature model generated by an exhaust temperature model module 314. The exhaust temperature model may be based on the IAT, MAF, fueling, and/or measured exhaust temperatures.

When the electric motor 198 is enabled and the engine 102 is disabled, the catalyst selection module 306 may determine which of the EHCs are to be heated by the heater actuator module 138. The heater control module 310 may determine the amount of energy to be applied to each EHC. The heater actuator module 138 heats the selected EHCs until each of the EHC temperatures are greater than or equal to the threshold temperature.

Figure 4:
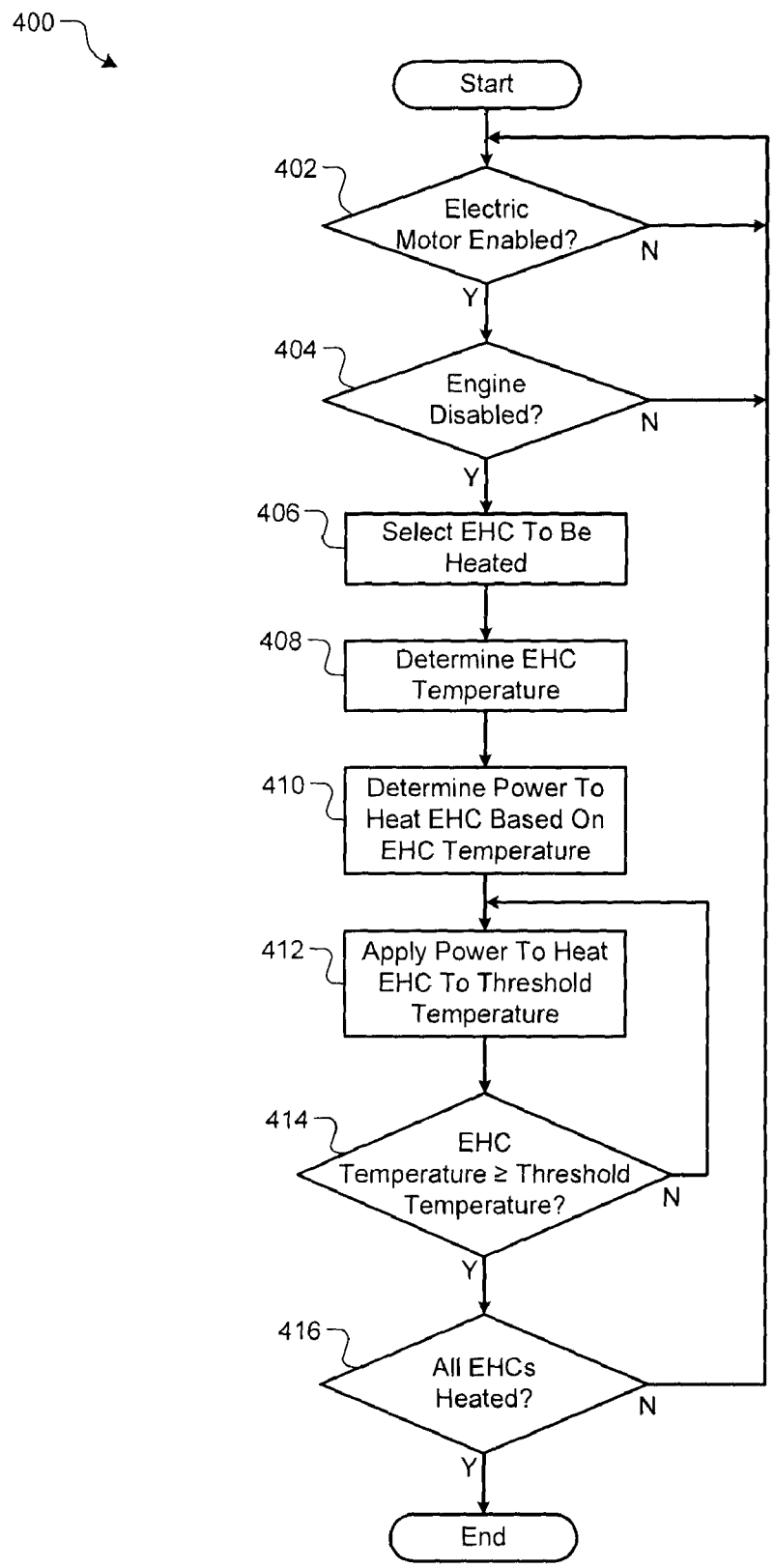
FIG. 4 is a flowchart depicting exemplary steps performed by the engine control module according to the principles of the present disclosure.

Referring now to FIG. 4, a flowchart 400 depicts an exemplary method performed by the ECM 114. Control begins in step 402 when control determines whether the electric mode is enabled. The electric mode may be enabled when the electric motor 198 is enabled. In step 404, control determines whether the engine 102 is disabled (shut down). When the electric mode is enabled and the engine 102 is disabled, control continues to step 406. In step 406, control selects an EHC to be heated. For example only, the EHC may be the EHC 206. In step 408, control determines the EHC temperature.

In step 410, control determines the power to be applied to increase the EHC temperature to the threshold temperature based on the EHC temperature. In step 412, control applies the power to heat the EHC to the threshold temperature. In step 414, control compares the EHC temperature with the threshold temperature. When the EHC temperature is less than the threshold temperature, control continues to heat the EHC. When the EHC temperature is greater than or equal to the threshold temperature, control may stop applying power to the EHC and continue to step 416.

In step 416, control determines whether all of the EHCs have been heated. For example only, control may include a counter that increments when each EHC has been heated to the threshold temperature. When the counter value is greater than or equal to the number of EHCs, control may end. Alternatively, control may continue to maintain the EHC temperatures at the threshold temperature. When one or more EHCs have not been heated, control returns to step 402.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An exhaust treatment system comprising:

M electrically heated substrates that are coated with a catalyst material and that are arranged in series to receive exhaust gas of an engine, wherein M is an integer greater than one; and a heater control module that applies power to N of the M substrates to heat the N substrates during a predetermined period, wherein N is an integer less than M, wherein the engine is turned off and the M electrically heated substrates do not receive exhaust gas during the predetermined period.

2. The system of claim 1, wherein the engine is disabled during the predetermined period.

3. The system of claim 1, wherein the heater control module stops applying power to the N substrates and starts applying power to P other ones of the M substrates to heat the P substrates after the N substrates reach a predetermined temperature, wherein P is an integer less than M.

4. The system of claim 1, wherein N is one and the heater control module applies power to a first one of the M substrates, and wherein the heater control module stops applying power to the first one and starts applying power to a second one of the M substrates when a temperature of the first one reaches a threshold temperature.

5. The system of claim 1, wherein N is one and the heater control module applies power to each of the M substrates one at a time, and wherein the heater control module stops applying power to each substrate when a temperature of the substrate reaches a threshold temperature during the predetermined period.

6. The system of claim 1, wherein the heater control module applies power to the N substrates for a predetermined period.

7. The system of claim 1, wherein each of the M electrically heated substrates includes an electrically resistive substrate that generates heat when the heater control module applies power.

8. The system of claim 1, wherein the catalyst material includes a three-way catalyst material.

9. The system of claim 1, further comprising P non-electrically heated substrates coated with the catalyst material and arranged in series with the M electrically heated substrates that receive the exhaust gas of the engine, wherein P is an integer greater than or equal to one.

10. The system of claim 1, wherein M is three or more and N is one.

11. A method comprising:
providing M electrically heated substrates that are coated with a catalyst material and that are arranged in series to receive exhaust gas of an engine, wherein M is an integer greater than one; and
applying power to N of the M substrates to heat the N substrates during a predetermined period, wherein N is an integer less than M,
wherein the engine is turned off and the M electrically heated substrates do not receive exhaust gas during the predetermined period.

12. The method of claim 11, further comprising disabling the engine during the predetermined period.

13. The method of claim 11, furthering comprising:
stopping application of power to the N substrates; and
applying power to P other ones of the M substrates to heat the P substrates after the N substrates reach a predetermined temperature, wherein P is an integer less than M.

14. The method of claim 11, further comprising:
applying power to a first one of the M substrates, wherein N is one;
stopping application of power to the first one; and
applying power to a second one of the M substrates when a temperature of the first one reaches a threshold temperature.

15. The method of claim 11, further comprising:
applying power to each of the M substrates one at a time, wherein N is one; and
stopping application of power to each substrate when a temperature of the substrate reaches a threshold temperature during the predetermined period.

16. The method of claim 11, further comprising applying power to the N substrates for a predetermined period.

17. The method of claim 11, further comprising providing M electrically heated substrates that each includes an electrically resistive substrate that generates heat when power is applied.

18. The method of claim 11, wherein the catalyst material includes a three-way catalyst material.

19. The method of claim 11, further comprising providing P non-electrically heated substrates coated with the catalyst material and arranged in series with the M electrically heated substrates that receive the exhaust gas of the engine, wherein P is an integer greater than or equal to one.

20. The method of claim 11, wherein M is three or more and N is one.

* * * * *